US008566418B2

(12) United States Patent  
Sheshagiri et al.

(10) Patent No.: US 8,566,418 B2  
(45) Date of Patent: Oct. 22, 2013

(54) CONFIGURABLE SYSTEM FOR USING INTERNET SERVICES ON CE DEVICES

(75) Inventors: Mithun Sheshagiri, Berkeley, CA (US); Phuong Nguyen, San Jose, CA (US); Priyang Rathod, Mountain View, CA (US); Anugeetha Kunjithapatham, Sunnyvale, CA (US); Alan Messer, Los Gatos, CA (US)

(73) Assignee: Samsung Electronics Co., Ltd, Suwon (KR)

( * ) Notice: Subject to any disclaimer, the term of this patent is extended or adjusted under 35 U.S.C. 154(b) by 1528 days.

(21) Appl. No.: 11/418,754

(22) Filed: May 4, 2006

(65) Prior Publication Data

US 2007/0260699 A1    Nov. 8, 2007

(51) Int. Cl.
*G06F 15/16*    (2006.01)

(52) U.S. Cl.
USPC .......................................... 709/217; 709/246

(58) Field of Classification Search
USPC ................ 705/26, 27; 709/246, 217; 715/200
See application file for complete search history.

(56) References Cited

U.S. PATENT DOCUMENTS

| | | | | |
|---|---|---|---|---|
| 5,983,268 A * | 11/1999 | Freivald et al. | ............... | 709/218 |
| 6,167,358 A * | 12/2000 | Othmer et al. | ................. | 702/188 |
| 6,278,448 B1 * | 8/2001 | Brown et al. | .................. | 715/866 |
| 6,538,673 B1 * | 3/2003 | Maslov | .......................... | 715/853 |
| 6,766,334 B1 * | 7/2004 | Kaler et al. | ..................... | 707/203 |
| 6,826,553 B1 * | 11/2004 | DaCosta et al. | ....................... | 1/1 |
| 7,085,994 B2 * | 8/2006 | Gvily | ............................. | 715/234 |
| 7,653,544 B2 * | 1/2010 | Bradley et al. | .............. | 704/270.1 |
| 7,966,184 B2 * | 6/2011 | O'Conor et al. | ............... | 704/260 |
| 8,041,127 B2 * | 10/2011 | Whitelaw | ....................... | 382/229 |
| 8,046,229 B2 * | 10/2011 | Bradley et al. | .............. | 704/270.1 |
| 8,260,616 B2 * | 9/2012 | O'Conor et al. | ............... | 704/260 |
| 2003/0097315 A1 * | 5/2003 | Guerrero et al. | ................. | 705/28 |
| 2003/0191711 A1 * | 10/2003 | Jamison et al. | .................. | 705/40 |
| 2004/0030687 A1 * | 2/2004 | Hidaka et al. | ...................... | 707/3 |
| 2004/0088420 A1 * | 5/2004 | Allen et al. | ..................... | 709/229 |
| 2004/0091116 A1 * | 5/2004 | Staddon et al. | ............... | 380/277 |
| 2004/0117376 A1 * | 6/2004 | Lavin et al. | ...................... | 707/10 |
| 2005/0159974 A1 * | 7/2005 | Moss et al. | ......................... | 705/1 |
| 2005/0165791 A1 * | 7/2005 | Chen et al. | ...................... | 707/10 |
| 2006/0095377 A1 * | 5/2006 | Young et al. | ..................... | 705/50 |
| 2006/0206448 A1 * | 9/2006 | Hyder et al. | ....................... | 707/1 |
| 2006/0230343 A1 * | 10/2006 | Armandpour et al. | ......... | 715/517 |
| 2006/0287989 A1 * | 12/2006 | Glance | .............................. | 707/3 |
| 2007/0073551 A1 * | 3/2007 | Williams et al. | ................... | 705/1 |
| 2007/0079236 A1 * | 4/2007 | Schrier et al. | ................. | 715/517 |
| 2007/0198459 A1 * | 8/2007 | Boone et al. | ...................... | 707/1 |
| 2007/0208687 A1 * | 9/2007 | O'Conor et al. | .................. | 707/1 |
| 2007/0250711 A1 * | 10/2007 | Storey | ........................... | 713/168 |

OTHER PUBLICATIONS

Livingston, K. et al., "Beyond Broadcast," 8th International Conference on Intelligent User Interfaces, Jan. 2003, pp. 260-262, Association for Computing Machinery, New York, NY.

* cited by examiner

*Primary Examiner* — Sargon Nano

(74) *Attorney, Agent, or Firm* — Kenneth L. Sherman, Esq.; Michael Zarrabian, Esq.; Sherman & Zarrabian LLP

(57) ABSTRACT

A configurable system brings Internet services, designed for PCs, to consumer electronics (CE) devices, and allows using external services such as Internet Services on CE devices. This reduces the need for input devices such as keyboards and mice, thereby making the configurable system suitable for CE devices. The configurable system relies on the structure of HTML/XML embedded in a Web page for information extraction by scrapping. Since cosmetic changes made to the Web site alter the embedded HTML/XML, the configurable system is updated whenever the Web site changes.

15 Claims, 3 Drawing Sheets

CONFIGURABLE SYSTEM FOR USING INTERNET SERVICES ON CE DEVICES

FIELD OF THE INVENTION

The present invention is related to systems for using Internet services, and in particular to a configurable system for using Internet Services on consumer electronics (CE) devices.

BACKGROUND OF THE INVENTION

In data searching and gathering over the Internet, using the structure of the Web-page to extract data is referred to as scrapping. A scraper includes certain rules that capture the structure of Web pages. A scraper browses web-pages on a Web site and uses rules to extract specific data from the web-pages. In a client-server model, this technique is applied in two configurations: (1) The entire scrapping application is installed on the client device, or (2) The scrapping application resides on a Web server, wherein the Web server extracts data and provides data to the client device.

However, once the Web site changes the structure of the Web pages, new rules that capture the new structure have to be used to make the scraper function correctly. In the first configuration above, the client device (e.g., PC) user has to update the scraper application on the client. This is a download update and install paradigm.

Such a paradigm works for PCs since they are homogenous compared to consumer electronics (CE) devices. Homogeneity in PCs refers to the fact that the variety of operating systems and hardware architectures available for PCs is small compared to that of CE devices. Also a PC being a general purpose device with large amounts of persistent storage, main memory and processing power allows the installations and update of limitless number of programs (e.g., scrapers).

On the other hand, CE devices are heterogeneous and are designed for specific use. CE devices also have limited storage, memory and computational power. This makes it difficult to apply the download update and install paradigm for CE devices. Installation, as is done for PCs, is not suitable for CE devices. The installation or update process in PCs makes use of mouse and keyboard. The process sometime assumes that the device has a file system that can be manipulated by the installer or updater. This assumption does not always hold true of most CE devices.

Further, for the second configuration above, a significant amount of infrastructure has to be set-up on the server side to make the service available.

BRIEF SUMMARY OF THE INVENTION

In one embodiment the present invention provides a configurable system, which brings Internet services, designed for PCs, to consumer electronics (CE) devices, and allows using external services such as Internet Services on CE devices. The present invention reduces the need for input devices such as keyboards and mice, thereby making a configurable system according to the present invention suitable for CE devices. In one example, such a configurable system relies on the structure of HTML/XML embedded in a Web page for information extraction by scrapping. Cosmetic changes made to the Web site alter the embedded HTML/XML. Therefore, such a configurable system is updated whenever the Web site changes. The present invention also provides methods for making these updates on CE devices.

The present invention further automates the location of the specific Internet service by making use of characteristics of Internet service. For example, if a user wants to find a book in an online shop, the present invention automates the process of locating the online shop Web page on a web site. This Web page is directly displayed to the user rather than asking the user to use the search feature on the Web site to find the Web page. As no input device such as keyboard or mouse is needed, this technique is therefore suited for CE devices.

Further, a technique for updating the scraper if the structure of the web page changes, according to the present invention, relies on rules that capture the structure of a Web site. These rules are enclosed in configuration files. A configurable system according to the present invention can be updated by downloading such configuration files. Since a configuration file does not alter the scraper execution code residing in the configurable system, a single configuration file suffices for all subscribing CE devices. As a result, distribution of updates to heterogeneous CE devices can be achieved easily. The actual scrapping is performed by a program which comprises execution code. The present invention provides a general scrapping infrastructure whose behavior can be changed using configuration files.

These and other features, aspects and advantages of the present invention will become understood with reference to the following description, appended claims and accompanying figures.

DETAILED DESCRIPTION OF THE INVENTION

Figure 1:
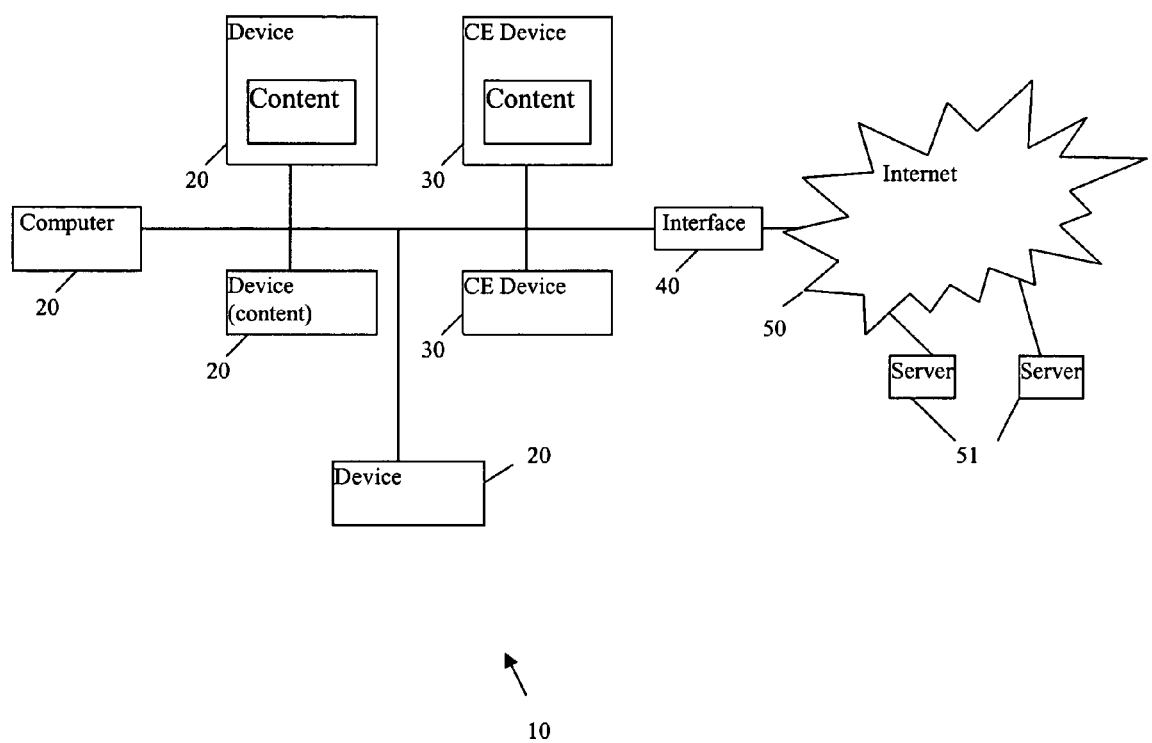
FIG. 1 shows an example of a network implementing an embodiment of the present invention.

In one embodiment the present invention provides a configurable system for using external services such as Internet Services on consumer electronics (CE) devices. Internet services are defined as source of information (e.g., news websites) or activities that involve transaction (e.g., buying books). Although the description herein refers to a client device (e.g., CE device) and a server (e.g., Web server/Internet), those skilled in the art will recognize that the present invention is applicable and useful in other applications and contexts which involve accessing services from a device.

Internet is a vast source of information including static Web pages and server hosted applications that produce web-pages dynamically (both are referred to herein as Web pages). Conventional technique of locating such information relies on search engines where the user specifies a need for information using a set of keywords. Once the search engine returns search results, the user uses the search results to find the appropriate Web page that may provide the needed information.

Search engines use a wide variety of techniques to find Web pages. All of these techniques are based on the principle of matching keywords provided by the user to those on Web pages. However, a group of words may not accurately capture the intention of the user and the search engine will not know the exact semantics of the words entered by the user. For example, "spears" could mean the last name of a pop star or the weapon, spear. As a result, the precision of the search results is poor. Therefore, users often have to go through several iterations where they try combinations of new keywords to find the information they want. The primary reason for this lack of precision is that information on the Internet is in the form of free text and machines cannot be made to understand information in free text. Although using a search engine and using keywords is widely used in PCs, as noted this technique is difficult to apply on CE devices.

In one implementation, the present invention brings Internet services that are designed for PCs, to CE devices. The present invention reduces the need for input devices such as keyboards and mice, thereby making a configurable system according to the present invention suitable for CE devices. A subset of information on the Internet is structured. For example, information displayed on some Web sites is rendered from structured sources like databases. In the case of such Web sites, it is possible to manually ascertain the semantics of a Web page and use it for information extraction. For example, a list of tracks for an album, on a particular Web site, is displayed in the same way for all albums. This implies that all pages about tracks of an album have the same structure.

According to an aspect of the present invention, this Web site structure (i.e., structure of a structured document) is ascertained and incorporated into the configurable system according to the present invention. Thereafter, using a scrapping process according to the present invention, the process of obtaining tracks for an album becomes more precise. If a Web site changes, the structure of e.g. a Web page, the Web site structure in the configurable system is updated to reflect these changes.

The present invention further automates the location of the specific Internet service by making use of characteristics of Internet service. For example, if a user wants to find a book in an online shop, the present invention automates the process of locating the web-page containing the specific book. This Web page is directly displayed to the user rather than asking the user to use the search feature on the Web site to find the Web page to buy the specific book. As no input device such as keyboard or mouse is needed, this technique is therefore suited for CE devices.

Further, a technique for updating the scraper if the structure of the web page changes, according to the present invention, relies on rules that capture the structure of a Web site. These rules are enclosed in configuration files. A configurable system according to the present invention can be updated by downloading such configuration files. Since a configuration file does not alter the scraper execution code residing in the configurable system, a single configuration file suffices for all subscribing CE devices. As a result, distribution of updates to heterogeneous CE devices can be achieved easily. The actual scrapping is performed by a program which comprises execution code. The present invention provides a general scrapping infrastructure whose behavior can be changed using configuration files.

In one example, such a configurable system relies on the structure of HTML/XML embedded in a Web page for information extraction by scrapping using a scrapping module. Since cosmetic changes made to the Web site alter the embedded HTML/XML, such a configurable system is updated whenever the Web site changes. The present invention also provides methods for making these updates on CE devices.

As noted, scrapping can be categorized into two processing categories: (1) Client-side Scrapping and (2) Server-side Scrapping. In Client-side Scrapping, processing required for scrapping takes place on the client side, whereas in Server-side Scrapping, scrapping takes place on the server side. Applying a pure client-side approach is taxing on CE devices as the configurable system has to be routinely updated. On the other hand, a pure server-side approach requires the set-up of significant server-side infrastructure. As such, in one aspect the present invention provides a hybrid approach wherein the scrapping process is performed on the client, and the server provides updates.

Accordingly, the scrapping module that resides on the client comprises scrapping software with the following capabilities: The client is capable of retrieving Web pages; the client can parse HTML/XML embedded in the retrieved Web pages; and based on certain rules stored in a configuration file, specific data can be extracted from the parsed HTML/XML. The server set-up only needs to host the configuration files.

FIG. 1 shows a functional architecture of an example network 10, such as a local network (e.g., home network), embodying aspects of the present invention. The network 10 comprises devices 20 (e.g., TV, VCR, PC, STB, etc.) which may include content, CE devices 30 (e.g., cell phone, PDA, etc.) which may include content, and interface 40 that connects the network 10 to an external network 50 (e.g., another local network, the Internet, etc.). The external network is connected to one or more servers 51. Though the devices 20 and 30 are shown separate, a single physical device can include one or more logical devices.

In one example, the hybrid scrapping approach of a configurable system according to the present invention is implemented by a client device 30 and a server 51, wherein the scrapping process is performed on the client 30, and the server 51 provides updates. As noted, the server set-up only needs to host the configuration files.

Figure 2:
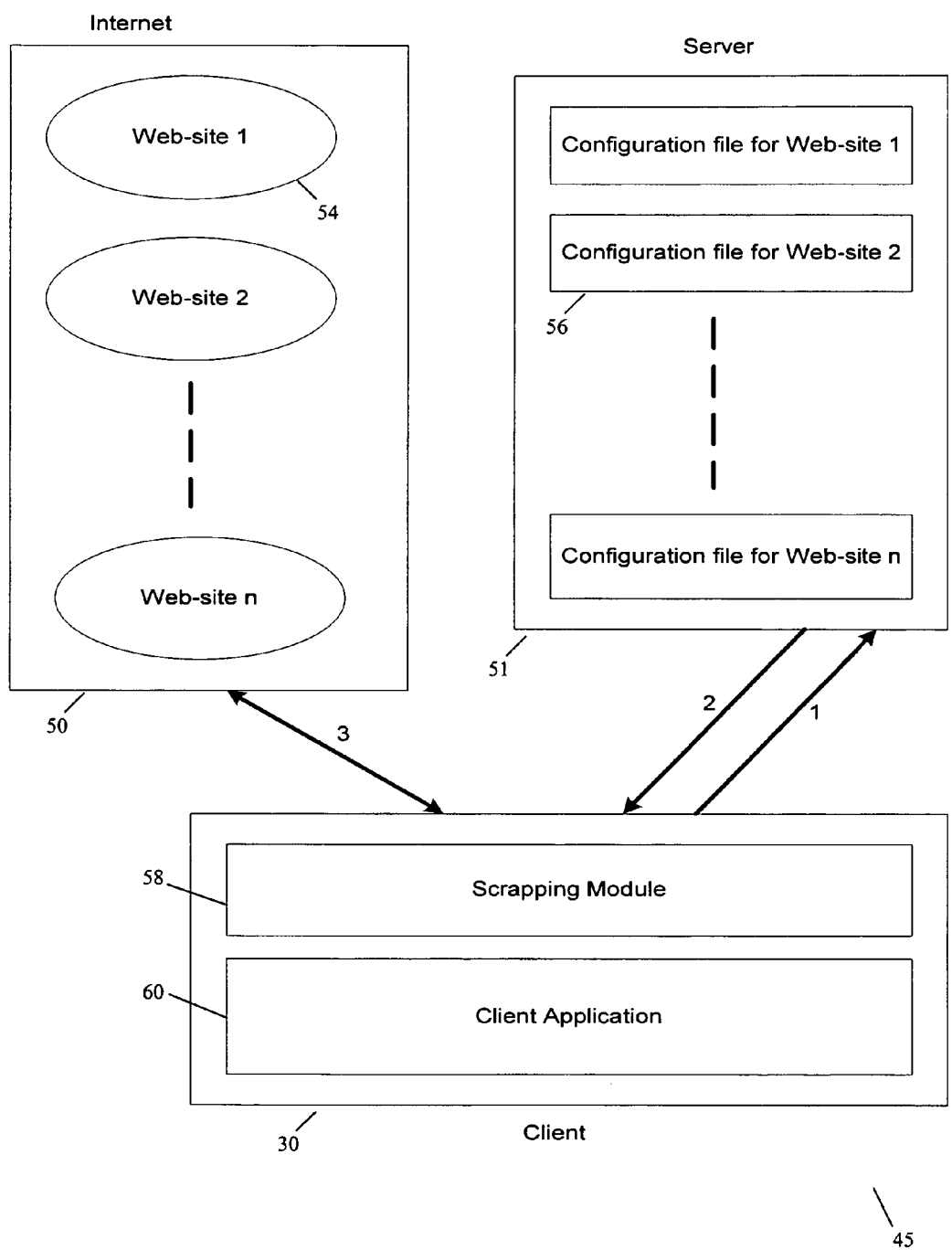
FIG. 2 shows a functional block diagram of a configurable system interaction that allows using external services such as Internet Services on consumer electronics (CE) devices, according to an embodiment of the present invention.

FIG. 2 shows a functional block diagram of the interaction of components of a configurable system 45, according to an embodiment of the present invention. As shown in FIG. 2, Internet 50 includes Web sites 54 (e.g., Web-site 1 . . . Web-site n), a server 51 includes configurations files 56 corresponding to Web sites 54 (e.g., Configuration file for Web-site 1 . . . Configuration file for Web-site n). The client 30 includes a scrapping module 58 and a client application 60. The example configurable system according to the present invention comprises the scrapping module 58 and the configurations files 56. The structure is determined manually and represented in the configuration file. The scraping module 58 reads the configuration file and knows how to parse the web-page.

The general operation involving of the configurable system 45 for the CE client device 30 communicating with the server 51 and Internet 50, includes the following steps, shown in conjunction with arrows in FIG. 2:

Step 1: The client 30 (e.g., Web browser on CE device queries the server 51 (e.g., Web server for configuration files 56)).

Step 2: The server 51 responds by providing a configuration file 56 which can be a new configuration file or an updated configuration file. The Client application 60 makes use of the scrapping module 58 to offer applications to the user. An example application allows the user to buy books, wherein the scrapping module 58 provides information about which book is available in which online shop. In this case the application with which user interacts is the client application 60. As such, the module 60 (FIG. 2) represents the client application that makes use of the data provided by scraping module 58. The data required by the application 60 is not directly available on the internet. Web-pages are retrieved by the scrapping module 58 which extracts specific data is extracted from these web-pages and that data is used by the application 60.

Step 3: The client 30 loads the configuration file 56 into the scrapping module 58 and the scrapping module 58 uses the information in the configuration file 56 to interact with a corresponding Web site 54 in Internet 50.

Figure 3:
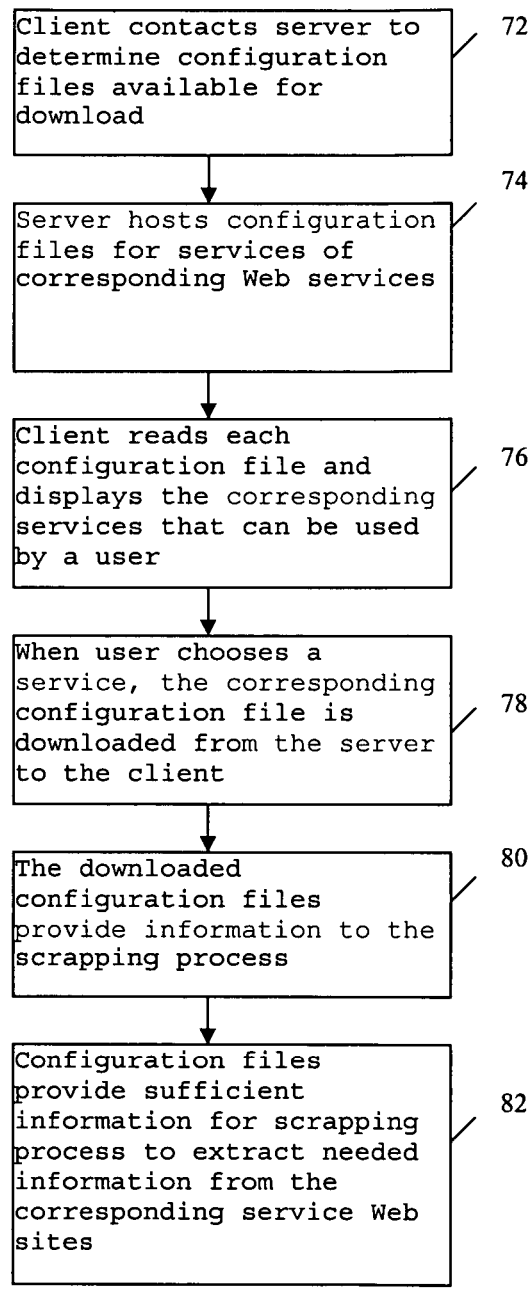
FIG. 3 shows a flowchart of the steps implemented in a configurable system that allows using external services such as Internet Services on consumer electronics (CE) devices, according to an embodiment of the present invention.

FIG. 3 shows a flowchart 70 of an embodiment of the steps implemented in the scrapping module 58, including:

Step 72: The client 30, on start-up, contacts the server 51 to determine the configuration files 56 available for download. In one example, location of the server 51 is added to the client 30 during design time.

Step 74: The server 51 hosts (maintains) n configuration files corresponding to n Internet services represented by web sites 54. Each configuration file 56 includes rules designed to allow the client 30 to interact with a particular corresponding Web site 54.

Step 76: The client 30 reads each configuration file 56 and displays the internet services (Web sites 54) that can be used by the user. Alternatively, the client device 30 need not decide which configuration file to use (it can be done on a server or through intelligent indexing, etc.).

Step 78: When the user chooses a particular service of a web-site 54, the corresponding configuration file 56 is downloaded from the server 51 and for use by the scrapping module 58.

Step 80: The downloaded configuration files 56 provide the following information to the scrapping module 58:
  a. The location of the internet service provider (URL). For example, ACME bookshop is located at http://www.acme.com.
  b. A description of the service.
  c. The interface to various services provided by the service provider.
  d. Rules that instruct the client 30 as to which fragments of HTML/XML are to be extracted.
  e. Semantics of the extracted data.
  f. Display information.
  g. Words relevant to the service.
  h. Version number of the configuration file.
  i. Preferred web-site information.

Step 82: The configuration file provides sufficient information for the scrapping module 58 to extract the data required by the user (e.g., information query) from the corresponding Web site 54 and display it to the user.

Now we consider the case where the structure of Web pages of a particular Web site 54 has changed and the user tries to access services of this Web site 54 using the scraper module 58. Before allowing the user to use such services, the scrapping module 58 first checks the version number of the corresponding configuration file 56 that the scrapping module 58 has, against the version of the configuration file 56 on the server 51. Based on the version number check, if the scrapping module 58 determines that a new version of configuration file 56 is available on the server 51, then the new configuration file 56 is downloaded from the server 51 to the client 30 and loaded into the scrapping module 58.

The amount of information to be scraped, and how the information is to be displayed, is implemented for each individual Web site 54 depending on multiple factors including: The service providers' needs, specific implementation of the Web site 54, the needs of the user, etc. For example, when an online shop Web site is made available via a CE device to the user utilizing a configurable system 45 according to the present invention, the service provider can set forth a condition for the CE device to display the product information as is,
in the form of the original Web page. In such cases, the scrapping module 58 scrapes the information from that Web page and processes it to identify that the Web page is indeed the Web page requested by the user. After identifying the Web page, the scrapping module 58 causes display of that Web page on the CE device. This constraint can be expressed in the corresponding configuration file 56, indicated in step 80(f) above.

Among the Web sites 54, there are those whose Web page structures change frequently, requiring updates to the configurable system 45 for proper functioning of the service provided by the Web site on the CE device 30. As frequent updates may not be feasible based on the amount of work required to generate the update, instead a simple form of scrapping can be employed which focuses on properties of a Web site that are relatively static. For example, the URL of a Web site is static. A configuration file 56 supports this set-up where the configuration file 56 contains only the name and URL of a Web site along with words relevant to the service (e.g., indicated in step 80(g) above).

For example, a travel portal company ACME (http://www.acme.com) lets users' book flights, hotels or rent cars. In addition to the company name and URL, the configuration file 56 corresponding for the Web site 54 of the ACME portal can include the following words: flights, hotel, car rental, etc. The configuration file 56 can also contain words corresponding to the destinations to which ACME offers flights. If a user is viewing content that has any of these words, the scrapping module 58 in the configurable system 45 makes use of these keywords to determine that ACME is a service that the user is interested and could therefore suggest this service and take the user to the ACME Web page.

The preferred web-site information (e.g., indicated in step 80(i) above) can be used to suggest the best services in the case that there are multiple services that might of interest to the user.

For better understating of the present invention, three example operation scenarios of a configurable system according to example embodiments of the present invention are now described.

Scenario 1: Online Shopping

This example explains how an online purchase of books, CDs, etc., can be enabled using a configurable system 45 according to an embodiment of the present invention. Consider the case where a user wishes to buy a music CD. The steps involved are as follows:
 1. User wishes to buy a particular album from the Internet 50 via a client 30 (FIG. 2) embodying the example configurable system 45 according to the present invention.
 2. The user asks the client application 60 to list the services available on the Internet 50. A user interacts with the client application 60, which in turn asks the scrapping module 58 to provide this information. The scrapping module 58 retrieves the information about the configuration files from the server.
 3. The client 30 retrieves and reads all of the configuration files 56 from a server 51 and based on the configuration files, lists the descriptions of services available to the user.
 4. The user chooses the e.g. ACME shopping service from among the available services.
 5. The corresponding configuration file 56 is loaded from the server 51 into the scrapping module 59 of the client 30.
 6. The service is now available on the client 30 for use by the user.

Scenario 2: Automatic Service Suggestion

This example explains how based on user activity, a service is presented to the user by a configurable system according to an embodiment of the present invention.
1. User is listening to a song on the client 30 which is in this example a TV.
2. The TV 30 retrieves meta-data (e.g., from mp3 files) about the song and identifies some attributes pairs. For example, Artist=Sting.
3. This information (e.g., Artist=Sting) is passed to the scrapping module 58 which matches the information against the description of the service in a configuration file 56 (e.g., all configurations files).
4. If one or more attributes match the keywords listed in the description in the configuration file 56, then the server 51 suggests the service which matched the attributes.
5. If the user chooses the suggested service, then the corresponding configuration file 56 is downloaded from the server 51 and service can be immediately used as described further above.

Scenario 3: Using the Scraper Module for Searching Specific Web Sites

Most commercial Web sites have an internal search engine. Typically, a user first enters the URL on a Web browser and then uses the internal search engine to locate a particular item. Sometimes the user has to specify what he is searching for to the internal search engine. For example, if the user is searching for music on an online music Web site, the user has to choose if the user is searching for the title of the song, or artist, or album name, etc. The step of entering the URL and choosing the options for the internal search engine of a site can be automated as follows according to the following steps implemented by the configurable system 45 according to an embodiment of the present invention:
1. User is listening to a song on the client 30 which is in this example a TV.
2. Using Scenario 2 above, an online shopping service is suggested to the user by the configurable system 45, and the suggested online shopping service Web site 54 is chosen by the user.
3. The corresponding configuration file 56 specifies the services available at the Web site 54. One of the services (e.g., the internal search engine of the web site) inputs the artist name and provides all of the albums of the artist that can be bought.
4. The scraper module 58 not only knows how to operate the search engine of the web site 54 but uses the meta-data of the song being listened by the user to choose the correct options in each engine. For example, if the meta-data indicates that the artist is Sting, then the scraper module 58 using the interface information in the configuration file 56 instructs the search engine to look for the artist name Sting.
5. The results of the search from the search engine can be viewed as Web pages on screens on the TV 30.

A configuration file will have information regarding the search service. For example, it may state that the search feature in the web-site can take artist and album name and return all corresponding albums. Or it might state that if artist is supplied as input, then some variable A has to be set to 0 and it might state that if album is the input then A should be set to 1. Interface information can include functions.

As such a configurable system according to the present invention brings Internet services, designed for PCs, to consumer electronics (CE) devices, and allows using external services such as Internet Services on CE devices. This reduces the need for input devices such as keyboards and mice, thereby making the configurable system suitable for CE devices. The configurable system relies on the structure of HTML/XML embedded in a Web page for information extraction by scrapping. Since cosmetic changes made to the Web site alter the embedded HTML/XML, the configurable system is updated whenever the Web site changes.

While the present invention is susceptible of embodiments in many different forms, these are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of providing services of an external network to a client device connected to the external network, comprising:
in a client device in a local network:
obtaining structure of a structured document from a server for accessing desired services in the external network corresponding to the structured document, wherein the structured document resides in the external network, wherein said structure of the structured document comprises rules for encoding documents in machine-readable form;
incorporating the obtained structure into a configuration file;
receiving the configuration file by the client device in the local network;
based on the obtained structure, performing a scraping process on the structured document to obtain information for providing desired services in the external network, wherein the scraping process is configured using the obtained structure in the configuration file;
providing the information for displaying on the client device;
providing a server connected to the client device; and
maintaining on the server manually created configuration files corresponding to certain Web pages in the external network.

2. The method of claim 1 wherein:
the external network comprises the Internet and the structured document comprises a Web page in a Web site in the external network providing services.

3. The method of claim 2 wherein:
said structure of the structured document comprises rules for encoding documents in machine-readable form; and
obtaining further includes obtaining the structure of machine-readable HTML/XML encoding embedded in the Web page for information extraction by scraping.

4. The method of claim 2 wherein a configuration file corresponding to each Web page includes rules for ascertaining structure of the Web page.

5. The method of claim 2 wherein scraping further includes hybrid scraping by performing scraping in the client device and providing configuration file updates to the client device from the server.

6. The method of claim 2 wherein the desired services is based on user activity.

7. The method of claim 2, wherein the scraping process is configurable to scrape different Web pages with different structures, based on respective Web page structures contained in corresponding configuration files.

8. The method of claim 2 further comprising updating the configuration file for the corresponding Web page as the Web page structure changes.

9. The method of claim 1 further comprising:
   querying the server by the client device for configuration files; and
   responding by the server by providing configuration file information.

10. The method of claim 9 wherein querying the server by the client device for configuration files further includes:
    using the available configuration files to display to a user the corresponding services in the external network that can be used by the user.

11. The method of claim 10 further including:
    receiving service selection by the user;
    the client device retrieving the corresponding configuration file from the server for scraping; and
    performing scraping by the client device using the obtained structure in the configuration file to interact with the corresponding Web page in the external network.

12. The method of claim 11 wherein the retrieved obtained structure in the configuration file includes one or more of:
    the location of the selected service provider in the external network;
    a description of the selected service;
    the interface to various services provided by the service provider;
    rules that instruct the client as to which fragments of HTML/XML in the Web page are to be extracted by scraping;
    semantics of the extracted data;
    display information;
    words relevant to the service;
    version number of the configuration file; and
    preferred Web page information.

13. The method of claim 11 wherein scraping further includes scraping sufficient information to extract information about the selected service from the Web page.

14. The method of claim 9 further comprising:
    checking a version of the configuration file stored in the client device against a version of a configuration file on the server in the external network; and
    when a new configuration file is available, downloading the new configuration file from the server in the external network.

15. The method of claim 1, wherein the information includes attribute pairs obtained from content meta-data.

* * * * *